(12) United States Patent
Messina

(10) Patent No.: US 11,319,981 B2
(45) Date of Patent: May 3, 2022

(54) BOLT PROVIDED WITH AN ANTI-ROTATION DEVICE

(71) Applicant: Airbus Operations SAS, Toulouse (FR)

(72) Inventor: Paolo Messina, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 202 days.

(21) Appl. No.: 16/745,643

(22) Filed: Jan. 17, 2020

(65) Prior Publication Data

US 2020/0232500 A1 Jul. 23, 2020

(30) Foreign Application Priority Data

Jan. 21, 2019 (FR) ...................................... 1900501

(51) Int. Cl.
| | |
|---|---|
| *F16B 39/04* | (2006.01) |
| *F16B 39/06* | (2006.01) |
| *F16B 37/04* | (2006.01) |

(52) U.S. Cl.
CPC ............ *F16B 39/06* (2013.01); *F16B 37/042* (2013.01); *F16B 39/04* (2013.01)

(58) Field of Classification Search
CPC .................................. F16B 39/04; F16B 39/10
USPC .................................................. 411/209, 221
See application file for complete search history.

(56) References Cited

U.S. PATENT DOCUMENTS

| | | | | |
|---|---|---|---|---|
| 566,050 A * | 8/1896 | Woodard | ................ | F16B 39/04 411/212 |
| 976,928 A | 11/1910 | Salisbury | | |
| 1,022,657 A * | 4/1912 | Buttner | .................. | F16B 39/04 411/211 |
| 1,099,510 A * | 6/1914 | O'Connor | ............... | F16B 39/04 411/320 |
| 1,100,173 A * | 6/1914 | Dadley | ................... | F16B 39/04 411/317 |
| 1,431,459 A * | 10/1922 | Hardie | .................... | F16B 39/10 411/221 |
| 1,440,938 A * | 1/1923 | Sieroslawski | .......... | F16B 39/10 411/221 |

(Continued)

FOREIGN PATENT DOCUMENTS

| | | |
|---|---|---|
| DE | 540815 C | 12/1931 |
| WO | 2014177499 A1 | 11/2014 |

OTHER PUBLICATIONS

French Search Report; priority document.

*Primary Examiner* — Flemming Saether
(74) *Attorney, Agent, or Firm* — Greer, Burns & Crain, Ltd.

(57) ABSTRACT

A bolt comprising a threaded shaft having at least one helical thread and at least one longitudinal groove, a nut having a tapped hole configured to be screwed onto the threaded shaft, and at least one diagonal slot which includes a first opening end and a second non-opening end. The diagonal slot is inclined from the first end towards the second end in the same direction as the helical thread of the threaded shaft. An anti-rotation device is configured to rotationally immobilize the nut with respect to the threaded shaft and comprises a ring which surrounds at least the threaded shaft and which has at least one first toe configured to be housed in the longitudinal groove of the threaded shaft and in the diagonal slot of the nut, in operation.

5 Claims, 11 Drawing Sheets

(56) References Cited

U.S. PATENT DOCUMENTS

| | | | |
|---|---|---|---|
| 1,651,187 A | 11/1927 | Cole | |
| 1,770,523 A * | 7/1930 | Jellison | F16B 39/04 |
| | | | 411/197 |
| 6,095,735 A * | 8/2000 | Weinstein | F16B 39/10 |
| | | | 411/197 |
| 9,845,822 B2 | 12/2017 | Pailhories | |
| 9,956,817 B2 * | 5/2018 | Miller | F16B 39/04 |

* cited by examiner

BOLT PROVIDED WITH AN ANTI-ROTATION DEVICE

CROSS-REFERENCES TO RELATED APPLICATIONS

This application claims the benefit of the French patent application No. 1900501 filed on Jan. 21, 2019, the entire disclosures of which are incorporated herein by way of reference.

FIELD OF THE INVENTION

The present invention relates to a bolt provided with an anti-rotation device.

BACKGROUND OF THE INVENTION

Figure 1:
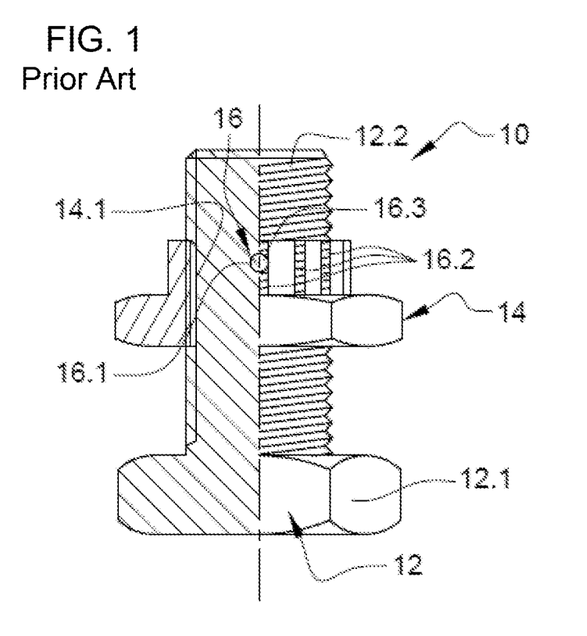
FIG. 1 is a half-view and a half-section of a bolt provided with an anti-rotation device which illustrates an embodiment from the prior art.

According to a known embodiment that can be seen in FIG. 1, a bolt 10 comprises a screw 12 which has a head 12.1 and a threaded shaft 12.2 as well as a nut 14 which has a tapped hole 14.1 configured to be screwed onto the threaded shaft 12.2 of the screw 12.

For the remainder of the description, a longitudinal direction is parallel to the axis of the threaded shaft 12.2 of the screw 12 or of the tapped hole 14.1 of the nut 14 and a transverse plane is perpendicular to the axis of the threaded shaft 12.2 of the screw 12 or of the tapped hole 14.1 of the nut 14.

This bolt 10 is provided with an anti-rotation device 16 in order to prevent the nut 14 from unscrewing. The anti-rotation device 16 comprises a transverse hole 16.1 arranged in the threaded shaft 12.2, a plurality of longitudinal slots 16.2 arranged in the nut 14 and a pin 16.3 configured to be housed in the transverse hole 16.1 of the threaded shaft 12.2 and in two diametrically opposite longitudinal slots 16.2 of the nut 14.

In operation, the nut 14 is screwed onto the threaded shaft 12.2 as far as the desired position. To rotationally immobilize the nut 14 with respect to the screw 12, the pin 16.3 is inserted into the transverse hole 16.1 and positioned in two longitudinal slots 16.2 of the nut 14 which are located as an extension of the transverse hole 16.1 of the threaded shaft 12.2. This embodiment is not fully satisfactory since the nut 14 can only be immobilized over a limited range of positions which is dependent upon the position of the transverse hole 16.1 and upon the length of the longitudinal slots 16.2. Moreover, one of the areas located as an extension of the transverse hole 16.1 must be clear in order to allow the pin 16.3 to be inserted.

SUMMARY OF THE INVENTION

The aim of the present invention is to overcome all or some of the disadvantages of the prior art.

To this end, the subject matter of the invention is a bolt comprising a threaded shaft having at least one helical thread, a nut having a tapped hole configured to be screwed onto the threaded shaft and an anti-rotation device configured to rotationally immobilize the nut with respect to the threaded shaft, characterized in that:
the threaded shaft comprises at least one longitudinal groove,
the nut comprises at least one diagonal slot including a first opening end and a second non-opening end, said diagonal slot being inclined from the first end towards the second end in the same direction as the helical thread of the threaded shaft,
the anti-rotation device comprises a ring which surrounds at least the threaded shaft and which has at least one first toe configured to be housed in the longitudinal groove of the threaded shaft and in the diagonal slot of the nut in operation.

According to the invention, the anti-rotation device can be put in place easily without requiring a tool. The ring has a limited mass and can be reused as long as it is not damaged. Finally, the tightening torque loss produced by the anti-rotation device can be precisely determined.

According to another feature, the ring comprises at least one first toe configured to be housed in the longitudinal groove of the threaded shaft in operation and at least one second toe configured to be housed in the diagonal slot of the nut in operation.

According to another feature, the threaded shaft comprises two diametrically opposite longitudinal grooves and the ring comprises two first toes, diametrically opposite, configured to be housed in the two longitudinal grooves.

According to another feature, the nut comprises several diagonal slots regularly distributed over the entire circumference of the nut and the threaded shaft comprises two longitudinal grooves forming therebetween an angle $\pi/n$, n being the number of diagonal slots of the nut.

According to another feature, each diagonal slot forms an angle of between 30° and 75° with a transverse plane.

According to another feature, the nut comprises a body provided with the tapped hole and a tubular portion, coaxial with respect to the tapped hole, including the diagonal slot(s).

According to a first embodiment, the tubular portion has an inner diameter greater than that of the tapped hole in order to form a housing between the tubular portion and the threaded shaft when the screw is screwed into the nut, the ring being configured to be housed in said housing.

According to another feature, each first toe of the ring is radially aligned with respect to a second toe, each first toe projecting with respect to an inner face of the ring and each second toe projecting with respect to an outer surface of the ring.

According to a second embodiment, the ring has an inner diameter greater than the outer diameter of the tubular portion such as to surround it in operation and the first toes and the second toes are merged, each first toe being configured to be housed in operation in a diagonal slot and in a longitudinal groove.

BRIEF DESCRIPTION OF THE DRAWINGS

Other features and advantages will emerge from the following description of the invention, which description is given solely by way of example, with reference to the appended drawings wherein.

DETAILED DESCRIPTION OF THE PREFERRED EMBODIMENTS

FIGS. 5 to 7, 10 and 11 represent a bolt 20 including a screw 22 having a head 24 and a threaded shaft 26, a nut 28 having a tapped hole 30 configured to be screwed onto the threaded shaft 26 and an anti-rotation device 32 configured to rotationally immobilize the nut 28 with respect to the screw 22, and more particularly with respect to the threaded shaft 26.

Figure 2:
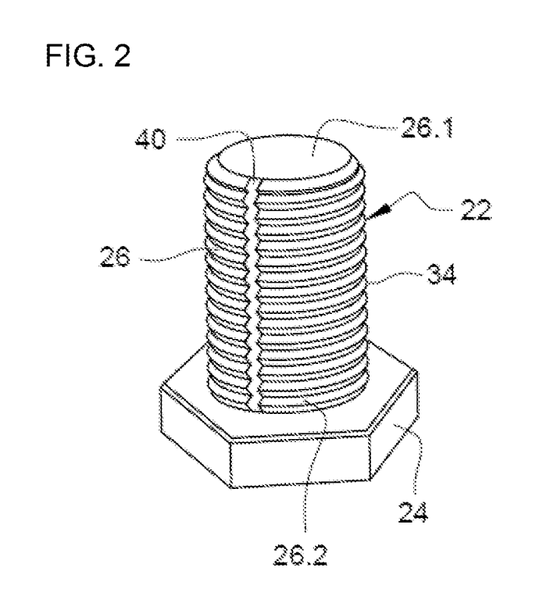
FIG. 2 is a perspective view of a screw which illustrates an embodiment of the invention.

According to an embodiment that can be seen in FIG. 2, the threaded shaft 26 comprises at least one first helical thread 34 having a pitch and a screwing direction. This threaded shaft 26 extends from a first end 26.1 from which the nut 28 is screwed as far as a second end 26.2 at which the head 24 is located. According to an embodiment, the first helical thread 34 can extend from one end of the threaded shaft 26 to the other. In a variant, the first helical thread 34 could only extend over part of the threaded shaft 26, from the first end 26.1.

According to one configuration, the head 24 is hexagonal. Of course, the invention is not limited to this configuration. Other solutions could be envisaged to rotationally immobilize the screw or to rotate it. Thus, the screw 22 could be without a head, like a dowel for example, and comprise an indentation at the second end 26.2 of the threaded shaft 26.

Figure 3:
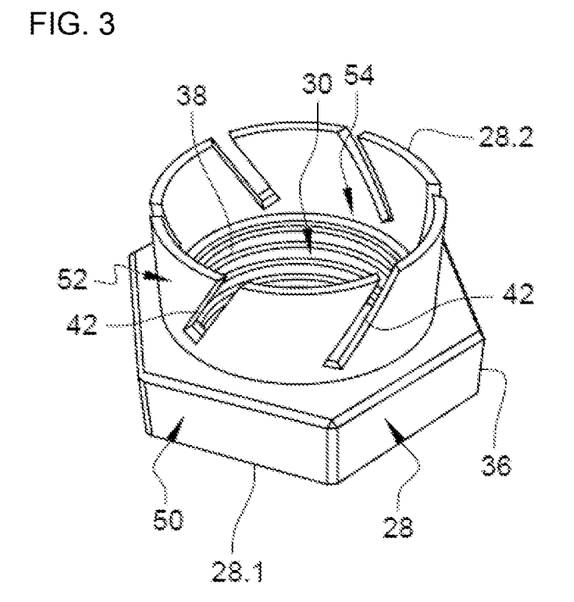
FIG. 3 is a perspective view of a nut which illustrates an embodiment of the invention.

The nut 28 comprises a hexagonal peripheral wall 36. Of course, the invention is not limited to this configuration. Other solutions could be envisaged to rotationally immobilize the nut or to rotate it.

Figure 6:
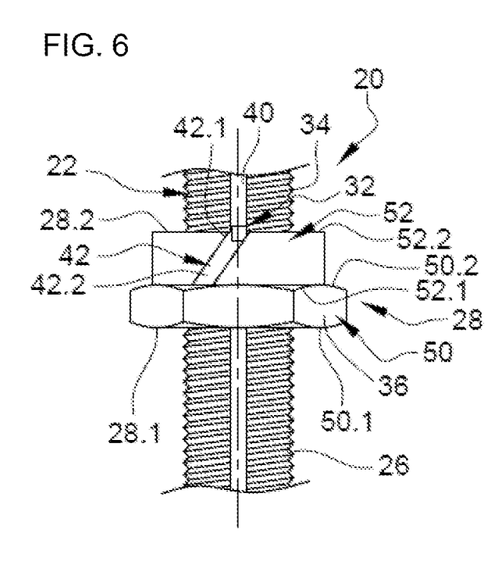
FIG. 6 is a side view of part of a bolt provided with an anti-rotation device when it is put in place which illustrates an embodiment of the invention.
Figure 7:
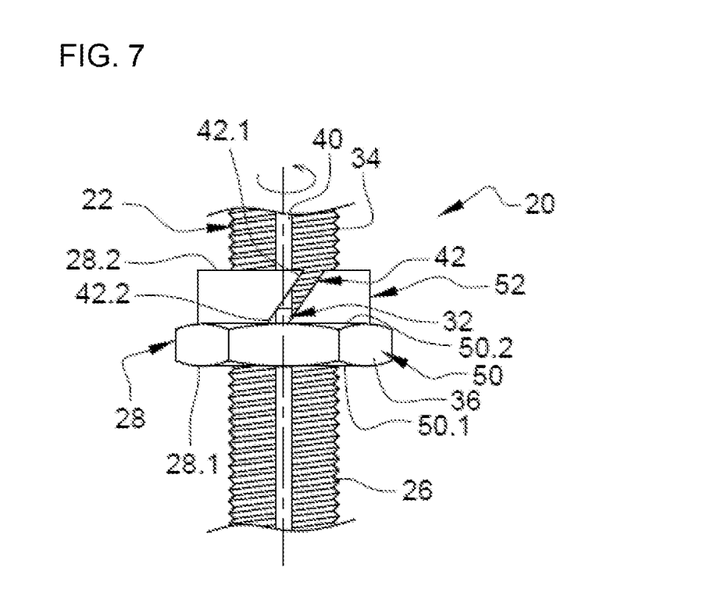
FIG. 7 is a side view of part of a bolt provided with an anti-rotation device in a locked state which illustrates an embodiment of the invention.
Figure 8:
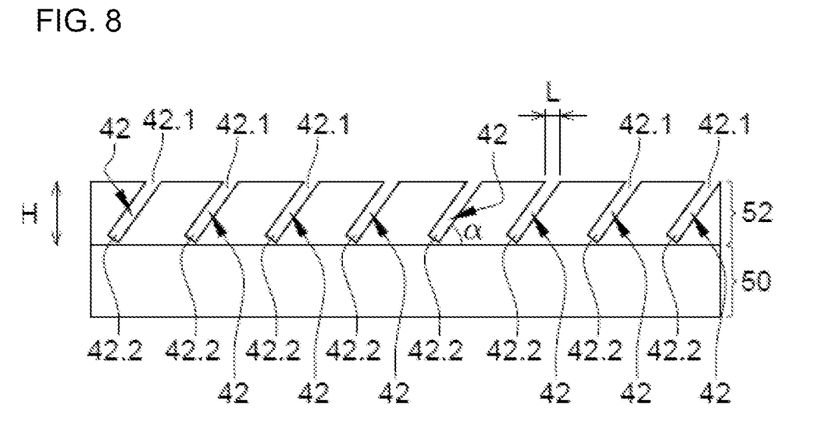
FIG. 8 is a developed side view of a nut which illustrates an embodiment of the invention.

According to one embodiment that can be seen in FIG. 3, the tapped hole 30 of the nut 28 comprises at least one second helical thread 38 having a pitch and a screwing direction that are suited to those of the first helical thread 34 of the threaded shaft 26. According to one configuration, the screwing direction of the nut 28 corresponds to the clockwise direction. In this case, as illustrated in FIGS. 6 and 7, the first helical thread 34 is inclined and descends from right to left when the screw 22 is observed from a side view.

Figure 4:
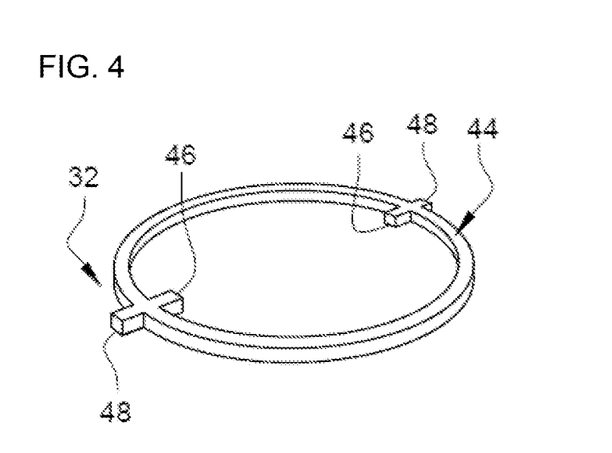
FIG. 4 is a perspective view of a rotationally immobilizing ring which illustrates an embodiment of the invention.
Figure 5:
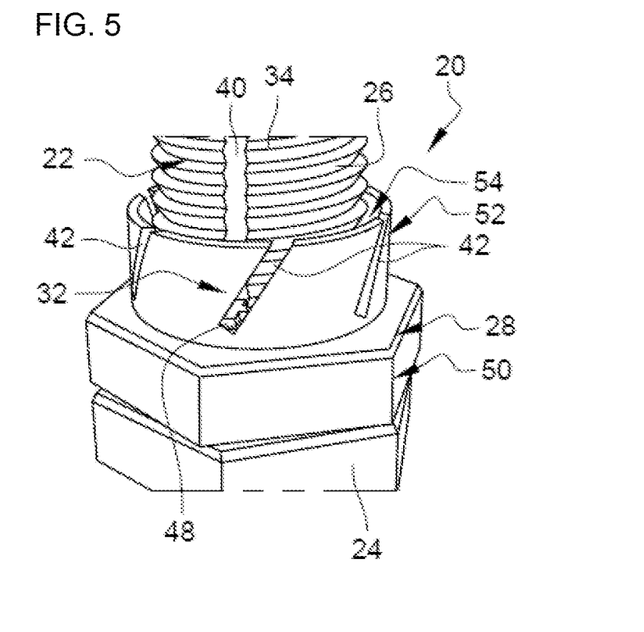
FIG. 5 is a perspective view of part of a bolt provided with an anti-rotation device which illustrates an embodiment of the invention.
Figure 10:
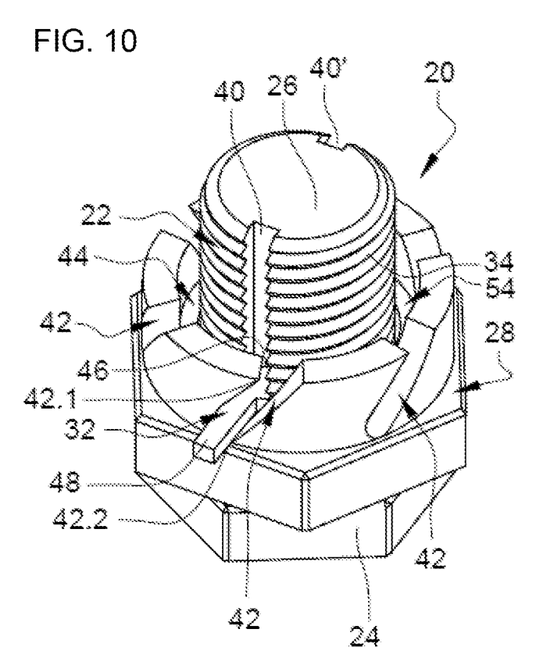
FIG. 10 is a perspective view of a bolt provided with an anti-rotation device which illustrates a first embodiment of the invention.

According to an embodiment that can be seen in FIGS. 4, 5 and 10, the threaded shaft 26 comprises at least one longitudinal groove 40, the nut 28 comprises at least one diagonal slot 42 and the anti-rotation device 32 comprises a ring 44 which surrounds at least the threaded shaft 26 and which has at least one first toe 46 configured to be housed in the longitudinal groove 40 of the threaded shaft 26 in operation and at least one second toe 48 configured to be housed in the diagonal slot 42 of the nut 28 in operation.

According to one configuration that can be seen in FIG. 10, the threaded shaft 26 comprises two longitudinal grooves 40, 40'. These two longitudinal grooves 40, 40' are diametrically opposite. Each longitudinal groove 40, 40' can extend from one end of the threaded shaft 26 to the other or only over part thereof, from the first end 26.1 of the threaded shaft 26. According to an embodiment, each longitudinal groove 40, 40' has, in a transverse plane, a U-shaped section and two planar side walls, which are parallel to one another and a planar bottom perpendicular to the side walls.

According to another configuration, the threaded shaft 26 comprises two longitudinal grooves 40, 40' which are not diametrically opposite, the two longitudinal grooves 40, 40' forming therebetween an angle π/n, n being the number of diagonal slots 42 provided at the nut 28. This configuration makes it possible to improve precision. According to this configuration, the anti-rotation device 32 comprises at least one first toe 46 configured to be housed in one of the longitudinal grooves 40, 40' and in one of the diagonal slots 42.

According to an embodiment, the nut 28 comprises two diametrically opposite diagonal slots 42.

Figure 11:
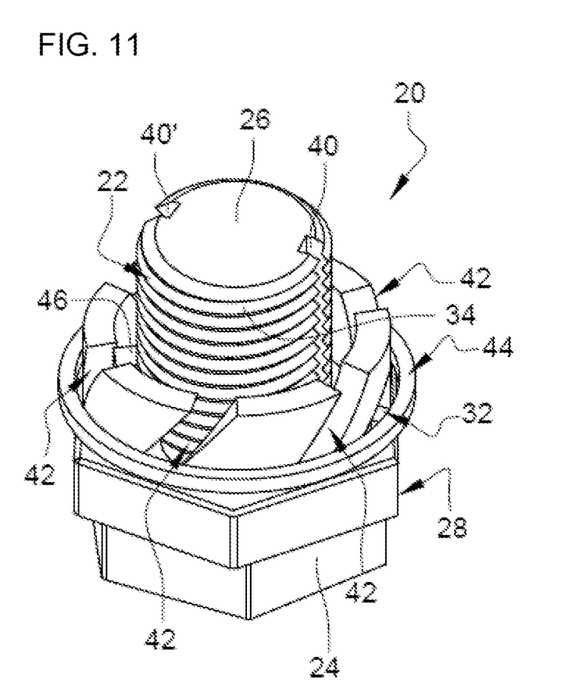
FIG. 11 is a perspective view of a bolt provided with an anti-rotation device which illustrates a second embodiment of the invention.

According to an embodiment that can be seen in FIGS. 3, 10, and 11, the nut 28 comprises several diagonal slots 42 regularly distributed over the entire conference of the nut 28. According to one configuration, the diagonal slots 42 are even in number.

Each diagonal slot 42 forms an angle α with a transverse plane less than 90°. Each diagonal slot 42 extends from a first end 42.1, which opens at the second end 28.2 of the nut 28, as far as a second non-opening end 42.2. Additionally, each diagonal slot 42 is inclined from the first end 42.1 towards the second end 42.2 in the same direction as the first helical thread 34 of the threaded shaft 26. Thus, as illustrated in FIGS. 6 and 7, when the screwing direction of the nut 28 corresponds to the clockwise direction, each diagonal slot 42 descends from right to left when the nut 28 is observed from a side view.

All of the diagonal slots 42 form the same angle α with a transverse plane. According to one configuration, the angle α is between 30° and 75°. According to the illustrated example, the angle α is approximately 60°. According to one configuration, each diagonal slot 42 is straight. However, the invention is not limited to these dimensions and to this geometry. Thus, the slots 42 may not be diagonal.

The nut 28 extends, in a longitudinal direction, between a first end 28.1 and a second end 28.2, the first end 28.1 corresponding to the end via which the threaded shaft 26 is inserted.

According to an embodiment, the nut 28 comprises a body 50 provided with the tapped hole 30 and a tubular portion 52, coaxial with respect to the tapped hole 30, including the diagonal slot(s) 42. The body 50 and the tubular portion 52 only form one and the same piece.

The body 50 has a first transverse face 50.1 which corresponds to the first end 28.1 of the nut 28 and a second transverse face 50.2. The first and second transverse faces 50.1, 50.2 are substantially parallel and linked by the tapped hole 30 and by the peripheral wall 36.

The tubular portion 52 comprises a first end 52.1 linked to the second transverse face 50.2 of the body 50 and a second end 52.2 which corresponds to the second end 28.2 of the nut 28. The tubular portion 52 has an inner face 52.3, oriented towards the axis of the tapped hole 30 and an outer face 52.4 opposite the inner face 52.3.

According to a first variant, each diagonal slot 42 is a through-slot and extends from the inner face 52.3 as far as the outer face 52.4. According to a second variant, each diagonal slot 42 is not a through-slot and is in the form of a groove, provided at the inner face 52.3, the bottom of which is at a distance from the outer face 52.4.

According to an embodiment, each diagonal slot 42 extends from the first end 52.1 as far as the second end 52.2 of the tubular portion. According to another embodiment, each diagonal slot 42 extends only over part of the tubular portion 52 from the first end 52.1 thereof.

By way of illustration, the tubular portion 52 has a thickness E of approximately 2 mm, a height H of approximately 4 mm and has 6 or 8 diagonal slots 42 which have a width L of approximately 2 mm.

Figure 9:
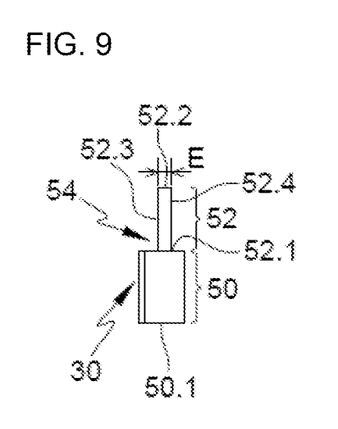
FIG. 9 is a cross-section of a nut which illustrates an embodiment of the invention.

According to a first embodiment, the tubular portion 52 has an inner diameter (diameter of the inner face 52.3) greater than that of the tapped hole 30 in order to form a housing 54 between the tubular portion 52 and the threaded shaft 26 when the screw 22 is screwed into the nut 28, as illustrated in FIGS. 5, 9 and 10. According to this first embodiment, the ring 44 has an inner diameter that is slightly greater than the diameter of the threaded shaft 26 of the screw 22 and an outer diameter which is slightly less than the inner diameter of the tubular portion 52 such that the ring 44 can be housed in operation in the housing 54, between the threaded shaft 26 and the tubular portion 52.

According to the first embodiment, each first toe 46 is radially aligned with a second toe 48, each first toe 46 projecting with respect to an inner face of the ring 44 and each second toe 48 projecting with respect to an outer surface of the ring 44. According to one configuration, the ring 44 comprises two first diametrically opposite toes 46, one for each longitudinal groove 40, 40', and two second toes 48, each of them being aligned with a first toe 46.

However, the invention is not limited to this layout for the first and second toes 46, 48. Thus, it would be possible for them not to be aligned.

According to a second embodiment that can be seen in FIG. 11, the tubular portion 52 has an inner diameter (diameter of the inner face 52.3) that is slightly greater than that of the tapped hole 30. According to this second embodiment, the ring 44 has an inner diameter greater than the outer diameter of the tubular portion 52. Thus, in operation, the ring 44 surrounds the tubular portion 52. According to this second embodiment, the first toes 46 and the second toes 48 are merged and the ring 44 only comprises first toes 46. Thus, each first toe 46 is housed in operation in a diagonal slot 42 and in a longitudinal groove 40. According to one configuration, the ring 44 comprises two first diametrically opposite toes 46.

The operating principle of the anti-rotation device is now explained with reference to FIGS. 6 and 7. The nut 28 is screwed onto the threaded shaft 26 by using, if necessary, a tool for controlling the tightening torque. When the tightening torque is reached, the ring 44 is positioned around the threaded shaft 26, the first toes 46 each being housed in one of the longitudinal grooves 40, 40'. Consequently, the ring 44 cannot rotate around the threaded shaft 26. The first end 42.1 of one of the diagonal slots 42 is placed in line with one of the longitudinal grooves 40, 40' such as to allow each first toe 46 or second toe 48 to be positioned at the first end 42.1 of a diagonal slot 42. By slightly unscrewing the nut 28, the ring 44 is translated towards the first end 28.1 of the nut 28 and each first toe 46 or second toe 48 moves toward the second end 42.2 of the diagonal slot 42 in which it is housed. Once the first end 42.1 of the diagonal slot 42 is no longer placed in line with one of the longitudinal grooves 40, 40', the ring 44 can no longer be removed. If the nut 28 continues to unscrew, each first toe 46 or second toe 48 moves towards the second end 42.2 of the diagonal slot 42 in which it is housed. When it reaches the second end 42.2 of the diagonal slot 42, it rotationally immobilizes the nut 28 which can no longer be unscrewed.

When there are six diagonal slots 42, the loss of tightening torque during unscrewing of the nut 28 in order to rotationally immobilize it is equal to a function max(360°/6−$a$ tan(4/πD); $a$ tan(4/πD)), D being the diameter of the tubular portion 52.

To unscrew the nut, the nut 28 should be re-screwed until each first toe 46 or second toe 48 reaches the first end 42.1 of the diagonal slot 42 which houses it. Consequently, the ring 44 can be translated as far as the first end 26.1 of the threaded shaft 26 and the nut 28 can be unscrewed.

The anti-rotation device 32 can be put in place easily without the need for a tool. The ring 44 has a limited mass and can be reused as long as it is not damaged. Finally, the loss of tightening torque can be determined precisely as a function of the angle α and of the length of each diagonal slot 42.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bolt comprising:
    a threaded shaft having at least one helical thread,
    a nut having a tapped hole configured to be screwed onto the threaded shaft, and
    an anti-rotation device configured to rotationally immobilize the nut with respect to the threaded shaft,
        the threaded shaft comprising at least one longitudinal groove,
        the nut comprising at least one diagonal slot including a first opening end and a second non-opening end, each diagonal slot being inclined from the first end towards the second end in a same direction as the helical thread of the threaded shaft, and
        the anti-rotation device comprising a ring which surrounds at least the threaded shaft and which has at least one first toe configured to be housed in a longitudinal groove of the threaded shaft and in a diagonal slot of the nut, in operation.

2. The bolt according to claim 1,
    wherein the threaded shaft comprises two diametrically opposite longitudinal grooves, and
    wherein the ring comprises two first toes, diametrically opposite, configured to be housed in the two longitudinal grooves.

3. The bolt according to claim 1, wherein each diagonal slot forms an angle of between 30° and 75° with a transverse plane.

4. The bolt according to claim 1, wherein the nut comprises a body provided with the tapped hole and a tubular portion, coaxial with respect to the tapped hole, including the at least one diagonal slot.

5. The bolt according to claim 4, wherein the tubular portion has an inner diameter greater than that of the tapped hole in order to form a housing between the tubular portion and the threaded shaft when the threaded shaft is screwed into the nut, the ring being configured to be housed in said housing.

* * * * *